J. Mix,
Spoon.
N° 5,473.   Patented Mar. 14, 1848.

UNITED STATES PATENT OFFICE.

JOHN MIX, OF CHESHIRE, CONNECTICUT.

SPOON.

Specification of Letters Patent No. 5,473, dated March 14, 1848.

*To all whom it may concern:*

Be it known that I, JOHN MIX, of Cheshire, in the county of New Haven and State of Connecticut, have invented a new, Improved, and Useful Britannia-Metal Spoon with a Handle of Iron or Composition-Metal Tinned; and I declare the following to be a full and exact description of the spoon and of the method of making it.

The nature of my invention consists in uniting and combining a handle of iron or composition metal with a bowl of Britannia metal.

To enable others skilled in the art to make, use, and apply my invention I describe the same and the process of making it, as follows.

The spoon consists of a handle of iron or composition metal in common shape made by hammering or rolling and thoroughly coated with tin in the usual mode of tinning sheet iron, and a bowl of Britannia metal inclosing one end of the handle in the brace of the bowl. This may be effected by casting the brace of the bowl hollow, or with a groove, and making fast the inserted handle by soldering or by the force of a drop and die, or which I much prefer by casting in the following manner, viz:—

The handle being prepared and tinned as above described is placed in the groove of a mold made to fit it, and extends one end into the hollow of the mold enlarged for the brace of the bowl. The melted metal is then poured into the mold for the bowl and by filling the hollow for the brace, surrounds the end of the handle and combines with it, and thus forms a tinned handled Britannia spoon, whether the handle be of iron or composition metal, but I prefer the tinned iron handle. For further illustration I refer to the drawings accompanying this specification as part thereof, by which.

Figure 1:
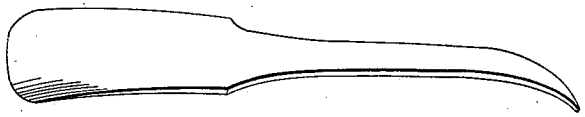
Figure 2:
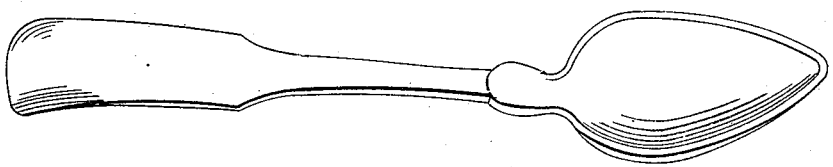

Figure 1 represents the handle. Fig. 2, represent the spoon made by uniting the handle with the bowl in the brace, by casting as aforesaid, or by soldering, or, by stamping it in place as above described.

This method of manufacturing spoons saves about one half the stock of the Britannia metal; thereby saving about one-third of the cost of the stock for spoons, and makes a stronger and more durable spoon, than those made wholly of Britannia metal, or other metal suitable for such spoons.

Claim:

I claim as my invention the union or combination of handles of iron or composition metal tinned with Britannia metal bowls in the manufacture of spoons, substantially in the manner specified above and spoons thus made, and therefore solicit Letters Patent.

JOHN MIX.

Witnesses:
SIMEON BALDWIN,
ROGER S. BALDWIN.